(12) United States Patent
Stellbrink et al.

(10) Patent No.: US 11,176,431 B2
(45) Date of Patent: Nov. 16, 2021

(54) CLASSIFICATION BASED PRINTING MATERIAL SET SELECTION

(71) Applicant: Hewlett-Packard Development Company, L.P., Spring, TX (US)

(72) Inventors: Joseph W. Stellbrink, Corvallis, OR (US); April E. Sullivan, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 433 days.

(21) Appl. No.: 16/330,586

(22) PCT Filed: Sep. 21, 2016

(86) PCT No.: PCT/US2016/052867
§ 371 (c)(1),
(2) Date: Mar. 5, 2019

(87) PCT Pub. No.: WO2018/056968
PCT Pub. Date: Mar. 29, 2018

(65) Prior Publication Data
US 2021/0279535 A1 Sep. 9, 2021

(51) Int. Cl.
*G06K 15/02* (2006.01)
(52) U.S. Cl.
CPC ..... *G06K 15/1823* (2013.01); *G06K 15/1849* (2013.01)

(58) Field of Classification Search
None
See application file for complete search history.

(56) References Cited

U.S. PATENT DOCUMENTS

| | | | |
|---|---|---|---|
| 6,834,934 B2 | 12/2004 | Kushner et al. | |
| 8,570,559 B2 | 10/2013 | Koh et al. | |
| 8,873,102 B2 | 10/2014 | Nielsen et al. | |
| 2012/0013660 A1 | 1/2012 | Mano | |
| 2015/0370208 A1 | 12/2015 | Kaisha | |
| 2018/0225071 A1* | 8/2018 | Shaw | G06F 3/1219 |
| 2019/0009473 A1* | 1/2019 | Morovic | B33Y 10/00 |

FOREIGN PATENT DOCUMENTS

EP  1049961  2/2005

OTHER PUBLICATIONS

Cleary, Nessan. What you need to know about Digital Inks. Nov. 19, 2014.
Hewlett Packard Company. HP Indigo colour selection. Every Color is within reach. 2009.

* cited by examiner

*Primary Examiner* — Dov Popovici
(74) *Attorney, Agent, or Firm* — Mannava & Kang

(57) ABSTRACT

In some examples, classification based printing material set selection may include analyzing a preliminary rendering of print data. Classification based printing material set selection may further include generating raster data based at least in part on a further rendering of the print data, and generating further print data including the raster data.

15 Claims, 4 Drawing Sheets

300

```
┌─────────────────────────────────────────────────────────┐
│  ANALYZE A PRELIMINARY RENDERING OF PRINT DATA TO       │
│  CLASSIFY EACH OBJECT OF A PLURALITY OF OBJECTS OF THE  │
│  PRELIMINARY RENDERING BY DETERMINING A PRINTING        │
│  MATERIAL COMBINATION FOR PRINTING EACH OBJECT          │
│                          302                            │
└─────────────────────────────────────────────────────────┘
                            ↓
┌─────────────────────────────────────────────────────────┐
│  DETERMINE, BASED ON AN ANALYSIS OF EACH OF THE         │
│  CLASSIFIED OBJECTS, A SUPERSET OF PRINTING MATERIALS   │
│  FOR ALL OF THE PLURALITY OF OBJECTS                    │
│                          304                            │
└─────────────────────────────────────────────────────────┘
                            ↓
┌─────────────────────────────────────────────────────────┐
│  SELECT, BASED ON THE DETERMINATION OF THE SUPERSET OF  │
│  PRINTING MATERIALS FOR ALL OF THE PLURALITY OF         │
│  OBJECTS, A SET OF PRINTING MATERIALS FROM A PLURALITY  │
│  OF AVAILABLE PRINTING MATERIALS THAT IS TO BE          │
│  ACTIVATED FOR A PRINT JOB SPECIFIED BY THE PRINT DATA  │
│                          306                            │
└─────────────────────────────────────────────────────────┘
                            ↓
┌─────────────────────────────────────────────────────────┐
│  GENERATE RASTER DATA BASED AT LEAST IN PART ON A       │
│  FURTHER RENDERING OF THE PRINT DATA AND THE SET OF     │
│  SELECTED PRINTING MATERIALS                            │
│                          308                            │
└─────────────────────────────────────────────────────────┘
                            ↓
┌─────────────────────────────────────────────────────────┐
│  GENERATE FURTHER PRINT DATA INCLUDING THE RASTER       │
│  DATA AND THE SET OF SELECTED PRINTING MATERIALS        │
│                          310                            │
└─────────────────────────────────────────────────────────┘
```

FIG. 3

CLASSIFICATION BASED PRINTING MATERIAL SET SELECTION

BACKGROUND

A printing device, such as a printer, multifunction printer, and/or other such devices may be described as a peripheral which is used to make a persistent human readable representation of graphics or text on physical media such as paper. For an ink based printing device, printing material (e.g., ink) may be ejected onto a physical medium to thereby print content onto the physical medium.

BRIEF DESCRIPTION OF DRAWINGS

Features of the present disclosure are illustrated by way of example and not limited in the following figure(s), in which like numerals indicate like elements, in which:

FIG. 3 illustrates a flowchart of a method for classification based printing material set selection, according to an example of the present disclosure.

DETAILED DESCRIPTION

Figure 1:
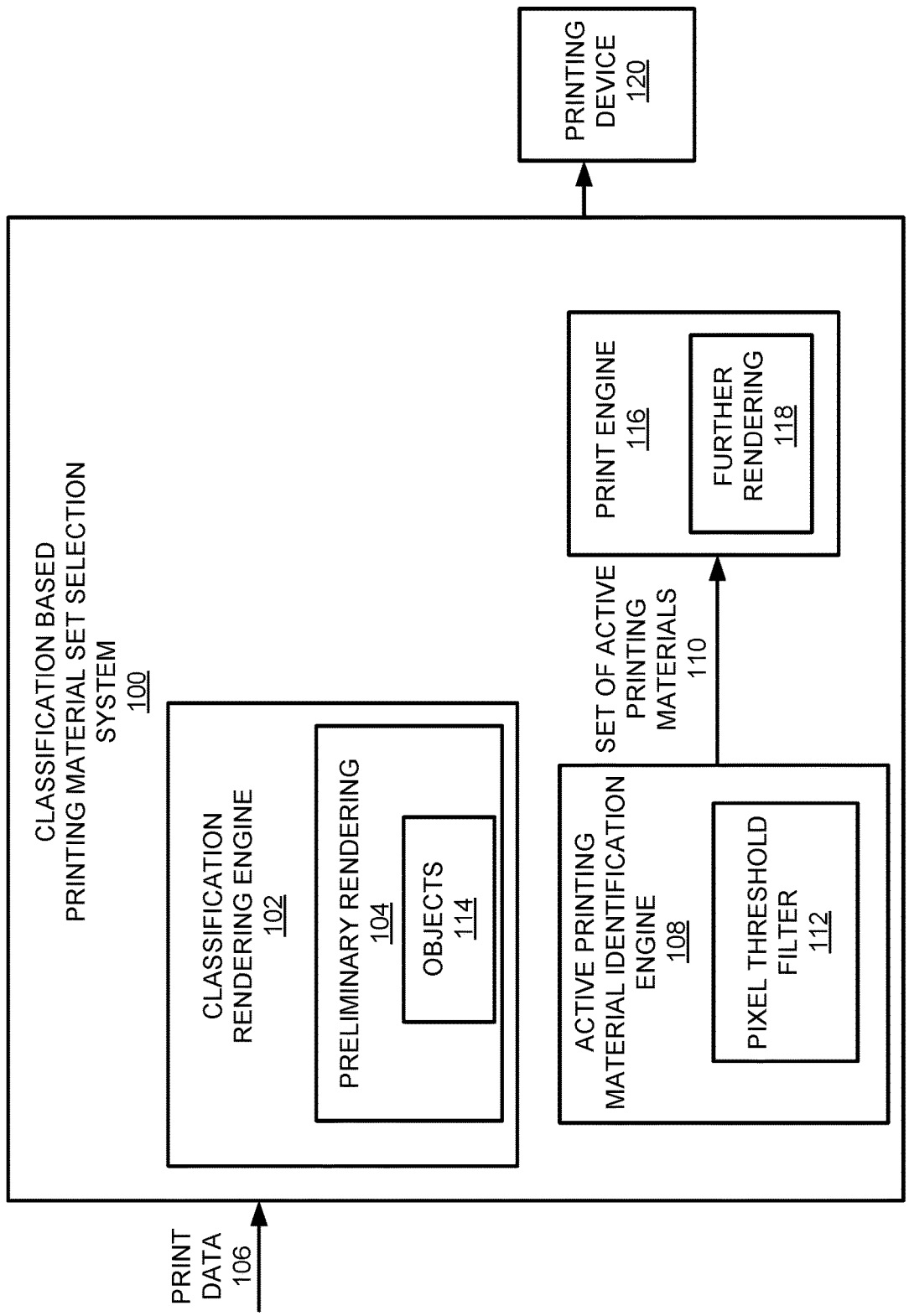
FIG. 1 illustrates a layout of a classification based printing material set selection system, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

A classification based printing material set selection system, a method for classification based printing material set selection, and a non-transitory computer readable medium having stored thereon machine readable instructions to provide classification based printing material set selection are disclosed herein. The system, method, and non-transitory computer readable medium disclosed herein provide for printing material set selection for a print job based on a preliminary rendering and printing material separation of print data for the print job, classification of objects into various active printing material set classifications, and selection of a superset printing material set.

For the system, method, and non-transitory computer readable medium disclosed herein, printing material may comprise consumable fluids as well as other consumable materials. Printing material may comprise ink, toner, fluids, powders, colorants, varnishes, finishes, gloss enhancers, binders, and/or other such materials that may be utilized in a printing process.

For the system, method, and non-transitory computer readable medium disclosed herein, a printing material set may be selected from a plurality of available printing materials. For example, for a CMYKOG color scheme, available printing materials may include CMYK printing materials and further printing materials such as orange (O), green (G), etc. For the CMYK color scheme, C represents cyan, M represents magenta, Y represents yellow, and K represents black. Further, for the CMYKOG color scheme, the CMYK printing materials may represent a base printing material set, and the orange (O), green (G) printing materials may represent additional printing materials.

For the system, method, and non-transitory computer readable medium disclosed herein, the preliminary rendering may represent a full-resolution (or a low-resolution) rendering using a same color management as a further rendering of the print data. The further rendering may be used to generate raster data. Alternatively, the preliminary rendering may represent a full-resolution (or a low-resolution) rendering using a different color management as the further rendering of the print data. The color management may be described as the process by which an image (e.g., a RGB image, where R represents red, G represents green, and B represents blue, is transformed to another format, such as a CMYK format).

For the system, method, and non-transitory computer readable medium disclosed herein, the printing material separation may represent a plane of the preliminary rendering. That is, the printing material separation may represent the data that will be printed for a particular colorant. For example, for a CMYK color scheme, a printing material separation may represent data for a data plane that will be printed by a printhead that prints cyan, data for a data plane that will be printed by a printhead that prints magenta, etc.

For the system, method, and non-transitory computer readable medium disclosed herein, an object may be described as a predetermined number (e.g., n×n, or a circle including a radius of n, etc.) of adjacently disposed pixels. In some examples, an object for a relatively small image (e.g., for a 7 cm×12 cm photograph) may be defined as a relatively small number (e.g., 10) of adjacently disposed pixels, whereas an object for a relatively large image (e.g., for a 3 m×6 m billboard) may be defined as a relatively large number (e.g., 200) of adjacently disposed pixels. For example, an object may be described as a 10×10 square (or circular, or another form) of adjacently disposed pixels. The aspect of utilizing an object for selection of a superset printing material set may eliminate randomly scattered pixels from impacting the printing material set selection as disclosed herein. The objects may be used in a sliding manner (e.g., a pixel at a time), such as across and down the preliminary rendering, to analyze the preliminary rendering in a step-by-step manner. Once a particular criteria being analyzed with respect to the objects is met (e.g., all available printing materials are needed as disclosed herein), further analysis of the preliminary rendering may be stopped.

For the system, method, and non-transitory computer readable medium disclosed herein, a superset printing material set may be described as a printing material set that includes printing materials that are common to all objects of a preliminary rendering.

In printing systems such as digital inkjet printing devices, printing materials beyond a set of base printing materials (e.g., where a base printing material set includes CMYK printing materials, and printing materials beyond the base printing material set include orange (O), green (G), etc.) may be included to provide expanded color reproduction capabilities. In low volume printing applications, the overhead of enabling additional printing materials which are not used in a print job may be relatively small. However, with respect to relatively large digital printing press applications, the overhead of enabling printing materials which are not used for a print job may add to printing costs and/or reduce output quality of a print job. For example, for each printing material that is enabled for printing, printing material may be consumed to maintain and potentially monitor printhead health (i.e., based on fluid ejector "spitting" and printhead health strips), which may add overhead over millions of printed pages. For fluid ejector firings that are not needed, such firings may contribute to printhead wear and potentially result in earlier printhead failure. Further, small amounts of paper may be wasted to enable printing of these additional printing materials as the number of active printing materials increases (e.g. "chipout" sizes may be dependent on the number of active printing materials). For example, the greater the number of active printing materials or printheads, the greater the "chipout" sizes, resulting in greater paper wastage. In cases where fluid ejectors are fired randomly in the printed content to help maintain printhead health, enabling additional printing materials that are not needed may waste printing material, and further reduce the perceived quality of a printed output as the random firings become more visible as they are more frequent. Additional costs may also be incurred with respect to wiping of the active, yet unneeded printheads, which consumes web wipe material.

The system, method, and non-transitory computer readable medium disclosed herein overcome these technical challenges in printing systems by analyzing a preliminary rendering of print data to classify each object of a plurality of objects of the preliminary rendering by determining a printing material combination for printing each object. An object may include a predetermined number of adjacently disposed pixels. Based on an analysis of each of the classified objects, a superset of printing materials for all of the plurality of objects may be determined. Based on the determination of the superset of printing materials for all of the plurality of objects, a set of printing materials from a plurality of available printing materials that is to be activated for a print job specified by the print data may be selected. Raster data based at least in part on a further rendering of the print data and the set of selected printing materials may be generated. Further print data including the raster data and the set of selected printing materials may be generated and forwarded to a printing device to generate a print job.

Engines, as described herein, may be any combination of hardware and programming to implement the functionalities of the respective engines. In some examples described herein, the combinations of hardware and programming may be implemented in a number of different ways. For example, the programming for the engines may be processor executable instructions stored on a non-transitory machine-readable storage medium and the hardware for the engines may include a processing resource to execute those instructions. In these examples, a computing device implementing such engines may include the machine-readable storage medium storing the instructions and the processing resource to execute the instructions, or the machine-readable storage medium may be separately stored and accessible by the computing device and the processing resource. In some examples, some engines may be implemented in circuitry.

FIG. 1 illustrates a layout of a classification based printing material set selection system (hereinafter also referred to as "system 100"), according to an example of the present disclosure. In some examples, the system 100 may include or be provided as a component of a print server for processing print data before the processed print data is transmitted to a printing system, such as an inkjet printer, or any type of printing device. For example, the system 100 may perform print job processing before the print job is sent to a printing system that includes a high-speed press. Alternatively, the system 100 may be a component of a printing device.

Referring to FIG. 1, the system 100 may include a classification rendering engine 102 to generate a preliminary rendering 104 of print data 106.

The system 100 may further include an active printing material identification engine 108 to analyze the preliminary rendering 104 to identify a set of active printing materials 110 for the print data 106 based at least in part on a pixel threshold filter 112. In some examples, the active printing material identification engine 108 may analyze the preliminary rendering 104 of the print data 106 to classify each object of a plurality of objects 114 of the preliminary rendering 104 by determining a printing material combination for printing each object. An object may include a predetermined number of adjacently disposed pixels.

The system 100 may further include a print engine 116 to generate raster data based at least in part on a further rendering 118 of the print data 106 and the set of active printing materials 110. Further, the print engine 116 may generate further print data including the raster data and the set of active printing materials 110. The print engine 116 may utilize the further rendering 118 to cause a printing device 120 to generate a print job from the print data 106.

As will be appreciated, some examples of the system 100 may be configured with more or less engines, where engines may be configured to perform more or less operations. Furthermore, in some examples, the engines may be implemented by execution of instructions with a processing resource to cause the processing resource to perform the corresponding operations.

Referring again to FIG. 1, operation of the system 100 is described in further detail.

The classification rendering engine 102 may generate the preliminary rendering 104 of the print data 106. In some examples, the classification rendering engine 102 may generate a full-resolution rendering using a same color management as the further rendering 118 of the print data 106. The full-resolution rendering may be generated for a full superset of available printing materials (e.g., where a superset of available printing materials includes a base printing material set and any additional printing materials, for example, where a base printing material set includes CMYK printing materials, and printing materials beyond the base printing material set include orange (O), green (G), etc.). The full-resolution rendering may represent the preliminary rendering 104, and the full-resolution rendering may be at a same resolution as the further rendering 118 of the print data 106. For example, a full-resolution rendering may be described as a 600×600 pixels per inch rendering, which corresponds to the same resolution as the further rendering 118 of the print data 106. The color management associated with the further rendering 118 of the print data 106 may include the values (e.g., the CMYK (and OG) values) of the particular printing materials for pixels.

In some examples, instead of the preliminary rendering being performed as a full-resolution rendering, the preliminary rendering may be performed at a lower resolution to reduce the level of computation needed. A lower resolution rendering may be described as a rendering that includes a lower resolution compared to the further rendering 118 of the print data. For example, assuming that a full-resolution rendering includes 600×600 pixels per inch, if objects 114 of a size of 20×20 pixels are to be analyzed, a lower resolution rendering of 100×100 pixels per inch may be used with objects 114 including a size of 5×5 pixels as such a lower resolution rendering would be adequate for analysis of such objects. In this regard, any impact on the determination of the set of active printing materials 110 may be negligible since small areas (e.g., areas of a size smaller than the objects 114) are typically in noisier areas of image content, and such small areas may not benefit from the use of a particular printing material.

In some examples, the classification rendering engine 102 may generate the preliminary rendering 104 of the print data 106 by generating the preliminary rendering 104 using a different color management compared to a color management used for the further rendering 118 of the print data 106. The different color management may be selected from a set of available color managements to identify the set of active printing materials 110 from a set of available printing materials. Further, the different color management may include reduced transitions between printing materials of the set of available printing materials. For example, the classification rendering engine 102 may generate the preliminary rendering 104 with modified color management resources that are targeted towards printing material classification rather than overall rendering quality. For example, for a CMYKO available set of printing materials, the color management resources used to generate the further rendering 118 may begin to use orange (O) printing material in colors that may be printed using CMYK printing materials in order to achieve smooth transitions between printing materials. However, the color management resources used for generation of the preliminary rendering may not need such smooth transitions. For the CMYKO available set of printing materials, if all of the colors needed by the print data 106 may be achieved by CMYK printing materials, the color management resources for the preliminary rendering may be set to output CMYK printing materials, while limiting the use of orange (O) printing material when needed to achieve colors outside of the CMYK gamut.

The active printing material identification engine 108 may analyze the preliminary rendering 104 to identify the set of active printing materials 110 for the print data 106 based at least in part on the pixel threshold filter 112. In some examples, the active printing material identification engine 108 may determine whether a number of pixels of the preliminary rendering 104 that include a specified printing material (e.g., cyan (C) printing material from a set of available printing materials that include CMYKO) from a set of available printing materials is greater than a pixel threshold of the pixel threshold filter 112. For example, the pixel threshold may be set at 1000 pixels that include a specified printing material out of 1,000,000 total pixels. Further, in response to a determination that the number of pixels of the preliminary rendering 104 that include the specified printing material from the set of available printing materials is greater than the pixel threshold of the pixel threshold filter 112, the active printing material identification engine 108 may add the specified printing material to the set of active printing materials 110.

In some examples, the active printing material identification engine 108 may determine whether a percentage of pixels of the preliminary rendering 104 that include a specified printing material from a set of available printing materials is greater than a pixel percentage threshold of the pixel threshold filter 112. For example, the pixel percentage threshold may be set at 2% of the pixels that include a specified printing material. Further, in response to a determination that the percentage of pixels of the preliminary rendering 104 that include the specified printing material from the set of available printing materials is greater than the pixel percentage threshold of the pixel threshold filter 112, the active printing material identification engine 108 may add the specified printing material to the set of active printing materials 110.

In some examples, the active printing material identification engine 108 may determine for each object of a plurality of the objects 114 of the preliminary rendering 104, whether a number of pixels of an object that include a specified printing material from a set of available printing materials is greater than a pixel object threshold of the pixel threshold filter 112. An object may be defined by a predetermined number of adjacently disposed pixels. In response to a determination, for each object of the plurality of objects 114 of the preliminary rendering 104, that the number of pixels of the object that include the specified printing material from the set of available printing materials is greater than the pixel object threshold of the pixel threshold filter 112, the active printing material identification engine 108 may add the specified printing material to the set of active printing materials 110. For example, for an object defined by a 10×10 square, the pixel object threshold may represent a number of pixels (e.g., 40 pixels (or 40% of the pixels) for a 10×10 square object that includes 100 pixels per inch) of the object that include the specified printing material from the set of available printing materials.

Alternatively or additionally, the pixel object threshold may include a plurality of thresholds associated with different pixel tones (e.g., a first threshold for light tones, a second threshold for medium tones, etc.).

Alternatively or additionally, the pixel object threshold may include a plurality of thresholds associated with different pixel printing material colors (e.g., a first threshold for cyan (C) printing material, a second threshold for magenta (M) printing material, etc.).

With respect to the use of objects, subsampling of the preliminary rendering 104 using the pixel threshold filter 112 with the goal that larger groups of pixels (i.e., the objects 114) that include an amount of the printing material above the pixel object threshold trigger a printing material to be active for the print job may filter out isolated image pixels or areas of relatively small printing material usage that have negligible effect on the final output print quality.

In some examples, the active printing material identification engine 108 may add the specified printing material to the set of active printing materials 110 in response to a determination, for each object of the plurality of objects 114 of the preliminary rendering 104, that the number of pixels of the object that include the specified printing material from the set of available printing materials is greater than the pixel object threshold (e.g., 40 pixels out of 100 pixels for a 10×10 pixels per inch object) of the pixel threshold filter 112.

According to another example, the active printing material identification engine 108 may add the specified printing material to the set of active printing materials 110 in response to a determination, for each object of the plurality of objects 114 of the preliminary rendering 104, that the percentage of pixels of the object that include the specified printing material from the set of available printing materials is greater than a pixel percentage object threshold (e.g., 40% of the pixels of an object) of the pixel threshold filter 112.

According to another example, the active printing material identification engine 108 may add the specified printing material to the set of active printing materials 110 in response to a determination, for each object of the plurality of objects 114 of the preliminary rendering 104, that the number (or percentage) of pixels of the object that include the specified printing material from the set of available printing materials is greater than an associated threshold of the pixel threshold filter 112, and further, the number (or percentage) of pixels of the object that include another specified printing material from the set of available printing materials is greater than another associated threshold of the pixel threshold filter 112. In this regard, determination of the set of active printing materials 110 may be based on a determination of whether a combination of pixels of an object include a particular combination of printing materials. For example, for a CMYK color scheme, black printing material (K) may be activated if a percentage of pixels (e.g., 40%) of an object include black printing material (K), a percentage of pixels (e.g., 20%) of an object include cyan printing material (C), a percentage of pixels (e.g., 10%) of an object include magenta printing material (M), etc. Similarly, if objects are not utilized, determination of the set of active printing materials 110 may be based on a determination of whether a combination of pixels of the preliminary rendering 104 include a particular combination of printing materials.

According to another example, the active printing material identification engine 108 may add the specified printing material to the set of active printing materials 110 in response to a determination, for each object of the plurality of objects 114 of the preliminary rendering 104, that a characteristic of pixels of the object that include the specified printing material from the set of available printing materials is greater than (or otherwise meets) an associated threshold of the pixel threshold filter 112. For example, the characteristic may include a particular tone (e.g., light, medium, dark, etc.) of a pixel, and/or an object. In this regard, a tone of an object may be determined, for example, by analyzing a number (or percentage) of pixels of an object that include a particular tone. For example, if a percentage (or number) based classification criteria is applied, an object may be classified as a particular tone if a percentage (or number) of the pixels of the object are a particular tone (e.g., 30% of the pixels of a 10×10 pixels object are a particular tone, where a threshold associated with the object is 25% of the pixels).

In some examples, for a set of active printing materials 110 that is identified from a set of available printing materials that include a predetermined number of base printing materials that is greater than one and a predetermined number of additional printing materials that is greater than zero, the active printing material identification engine 108 may analyze the preliminary rendering 104 to identify the set of active printing materials 110 for the print data 106 based at least in part on the pixel threshold filter 112 to identify the set of active printing materials 110 that include at least one of the predetermined number of base printing materials, and none of the predetermined number of additional printing materials. For example, for a set of active printing materials 110 is identified from a set of available printing materials that include a CMYK color scheme, the active printing material identification engine 108 may analyze the preliminary rendering to identify the set of active printing materials for the print data 106 based at least in part on the pixel threshold filter to identify the set of active printing materials 110 that include C, M, Y, and/or K. Accordingly, the identification of the set of active printing materials may be used for printing materials beyond a base printing material set (e.g., CMYKO, CMYKOG, CMYKOGV), but also for the base printing material set (e.g., CMYK). For example, if it is determined that cyan (C) printing material is not needed for the incoming print data, the cyan printheads may remain in an inactive (e.g., dormant) state.

The print engine 116 may generate raster data based at least in part on the further rendering 118 of the print data 106 and the set of active printing materials 110. Further, the print engine 116 may generate further print data including the raster data and the set of active printing materials 110. The print engine 116 may utilize the further rendering 118 to cause the printing device 120 to generate a print job from the print data 106. In this regard, once the set of active printing materials 110 is identified, this information may be forwarded to the print engine 116, where the appropriate color management resources and settings for the active printing material set may be selected. For example, a print job may be submitted without knowledge of whether additional orange (O) and green (G) printing materials are to be used. For a CMYKOG color set of the available printing materials, if the classification rendering engine 102 and the active printing material identification engine 108 indicate that the print job may be printed using CMYK printing materials, the print job may then be rendered using CMYK color management, preventing waste associated with activating the orange (O) and green (G) printing materials. On the other hand, if orange (O) printing material is needed to achieve colors for certain objects 114, the CMYKO color management may be selected, still avoiding activation of the green (G) printing material.

Figure 2:
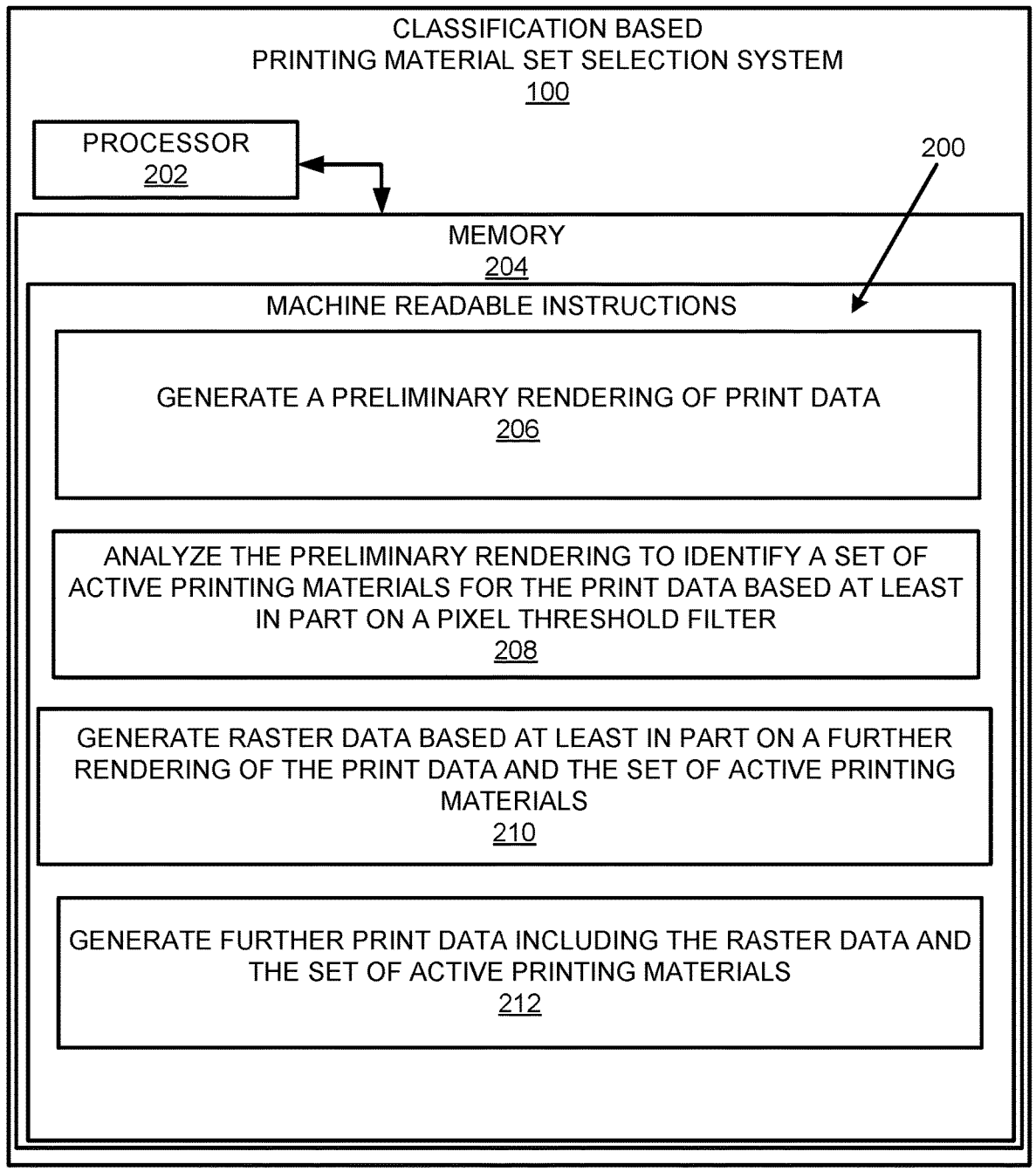
FIG. 2 illustrates a block diagram for classification based printing material set selection, according to an example of the present disclosure.
Figure 4:
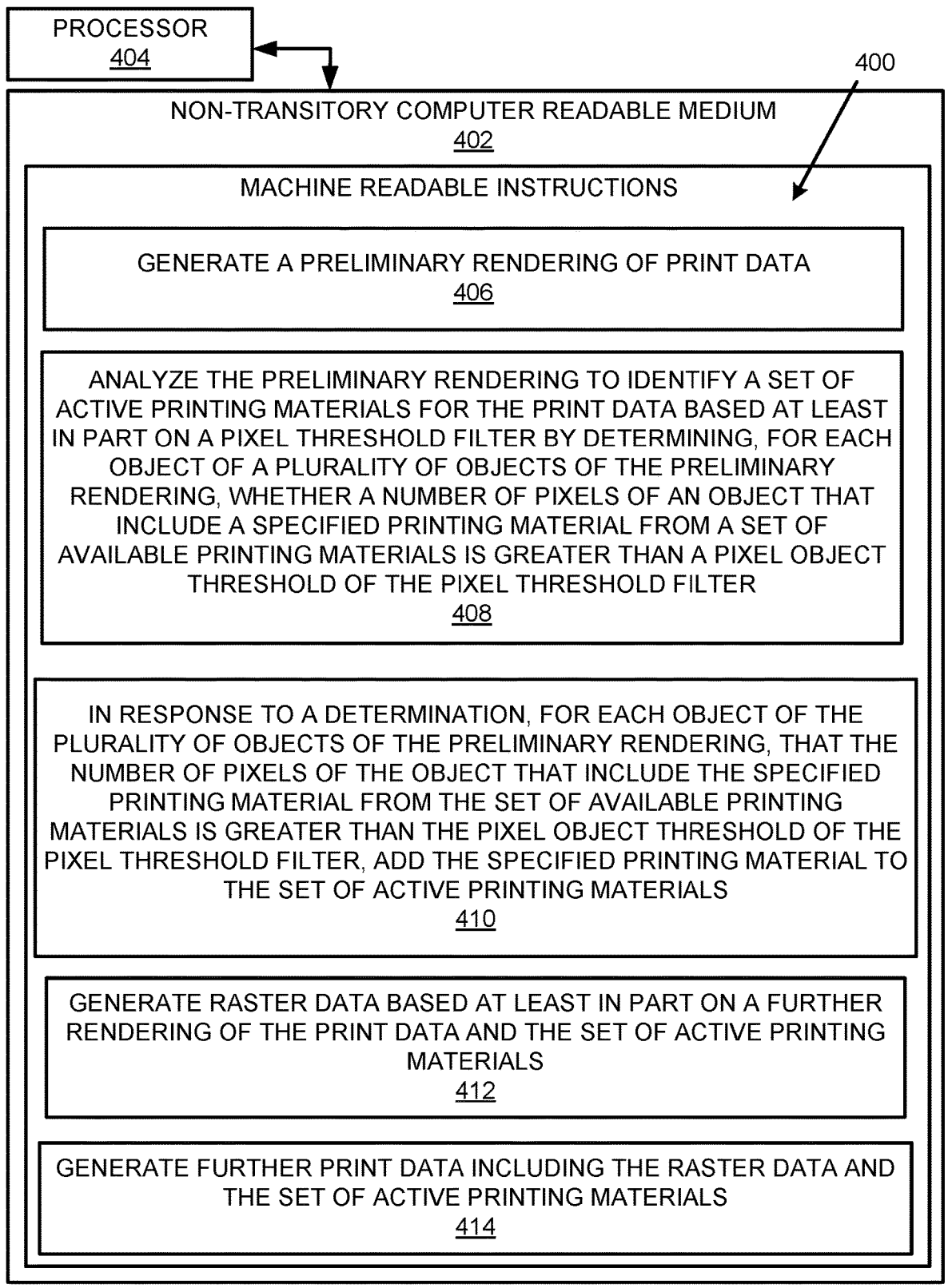
FIG. 4 illustrates a further block diagram for classification based printing material set selection, according to an example of the present disclosure.

FIGS. 2-4 respectively illustrate a block diagram 200, a flowchart of a method 300, and a further block diagram 400 for classification based printing material set selection, according to examples. The block diagram 200, the method 300, and the block diagram 400 may be implemented on the system 100 described above with reference to FIG. 1 by way of example and not limitation. The block diagram 200, the method 300, and the block diagram 400 may be practiced in other systems. In addition to showing the block diagram 200, FIG. 2 shows hardware of the system 100 that may execute the instructions of the block diagram 200. The hardware may include a processor 202, and a memory 204 storing machine readable instructions that when executed by the processor cause the processor to perform the instructions of the block diagram 200. The memory 204 may represent a non-transitory computer readable medium. FIG. 3 may represent a method for classification based printing material set selection, and the steps of the method. FIG. 4 may represent a non-transitory computer readable medium 402 having stored thereon machine readable instructions to provide classification based printing material set selection. The machine readable instructions, when executed, cause a processor 404 to perform the instructions of the block diagram 400 also shown in FIG. 4.

The processor 202 of FIG. 2 and/or the processor 404 of FIG. 4 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 402 of FIG. 4), such as hardware storage devices (e.g., RAM (random access memory), ROM (read only memory), EPROM (erasable, programmable ROM), EEPROM (electrically erasable, programmable ROM), hard drives, and flash memory). The memory 204 may include a RAM, where the machine readable instructions and data for a processor may reside during runtime.

Referring to FIGS. 1-2, and particularly to the block diagram 200 shown in FIG. 2, at block 206, the memory 204 may include instructions to generate (e.g., by the classification rendering engine 102) the preliminary rendering 104 of the print data 106.

At block 208, the memory 204 may include instructions to analyze (e.g., by the active printing material identification engine 108) the preliminary rendering 104 to identify the set of active printing materials 110 for the print data 106 based at least in part on the pixel threshold filter 112.

At block 210, the memory 204 may include instructions to generate (e.g., by the print engine 116) raster data based at least in part on the further rendering 118 of the print data 106 and the set of active printing materials 110.

At block 212, the memory 204 may include instructions to generate (e.g., by the print engine 116) further print data 106 including the raster data and the set of active printing materials 110.

Referring to FIGS. 1 and 3, and particularly FIG. 3, for the method 300, at block 302, the method may include analyzing (e.g., by the active printing material identification engine 108) the preliminary rendering 104 of the print data 106 to classify each object of the plurality of objects 114 of the preliminary rendering 104 by determining a printing material combination for printing each object. According to an example, an object includes a predetermined number of adjacently disposed pixels.

At block 304, the method 300 may include determining (e.g., by the active printing material identification engine 108), based on an analysis of each of the classified objects 114, a superset of printing materials for all of the plurality of objects 114. According to an example, the superset of printing materials includes printing materials common to all of the plurality of objects 114.

At block 306, the method 300 may include selecting (e.g., by the active printing material identification engine 108), based on the determination of the superset of printing materials for all of the plurality of objects 114, a set of printing materials from a plurality of available printing materials that is to be activated for a print job specified by the print data 106.

At block 308, the method 300 may include generating (e.g., by the print engine 116) raster data based at least in part on a further rendering 118 of the print data 106 and the set of selected printing materials.

At block 310, the method 300 may include generating (e.g., by the print engine 116) further print data 106 including the raster data and the set of selected printing materials.

Referring to FIGS. 1 and 4, and particularly FIG. 4, for the block diagram 400, at block 406, the non-transitory computer readable medium 402 may include instructions to generate (e.g., by the classification rendering engine 102) the preliminary rendering 104 of the print data 106.

At block 408, the non-transitory computer readable medium 402 may include instructions to analyze (e.g., by the active printing material identification engine 108) the preliminary rendering 104 to identify the set of active printing materials 110 for the print data 106 based at least in part on the pixel threshold filter 112 by determining, for each object of the plurality of objects 114 of the preliminary rendering 104, whether a number of pixels of an object that include a specified printing material from a set of available printing materials is greater than a pixel object threshold of the pixel threshold filter 112.

At block 410, in response to a determination, for each object of the plurality of objects 114 of the preliminary rendering 104, that the number of pixels of the object that include the specified printing material from the set of available printing materials is greater than the pixel object threshold of the pixel threshold filter 112, the non-transitory computer readable medium 402 may include instructions to add (e.g., by the active printing material identification engine 108) the specified printing material to the set of active printing materials 110.

At block 412, the non-transitory computer readable medium 402 may include instructions to generate (e.g., by the print engine 116) raster data based at least in part on the further rendering 118 of the print data 106 and the set of active printing materials 110.

At block 414, the non-transitory computer readable medium 402 may include instructions to generate (e.g., by the print engine 116) further print data 106 including the raster data and the set of active printing materials 110.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A system comprising:
  a classification rendering engine to generate a preliminary rendering of print data;
  an active printing material identification engine to analyze the preliminary rendering to identify a set of active printing materials for the print data based at least in part on a pixel threshold filter; and
  a print engine to:
    generate raster data based at least in part on a further rendering of the print data and the set of active printing materials; and
    generate further print data including the raster data and the set of active printing materials.

2. The system according to claim 1, wherein the classification rendering engine is to generate the preliminary rendering of the print data by:
  generating a full-resolution rendering using a same color management as the further rendering of the print data, wherein the full-resolution rendering represents the preliminary rendering, and wherein the full-resolution rendering is at a same resolution as the further rendering of the print data.

3. The system according to claim 1, wherein the classification rendering engine is to generate the preliminary rendering of the print data by:
  generating a low-resolution rendering using a same color management as the further rendering of the print data, wherein the low-resolution rendering represents the preliminary rendering, and wherein the low-resolution rendering is at a lower resolution compared to the further rendering of the print data.

4. The system according to claim 1, wherein the classification rendering engine is to generate the preliminary rendering of the print data by:
  generating the preliminary rendering using a different color management compared to a color management used for the further rendering of the print data, wherein the different color management is selected from a set of available color managements to identify the set of active printing materials from a set of available printing materials, and the different color management includes reduced transitions between printing materials of the set of available printing materials.

5. The system according to claim 1, wherein the set of active printing materials is identified from a set of available printing materials that include a CMYK color scheme, where C represents cyan, M represents magenta, Y represents yellow, and K represents black, and the active printing material identification engine is to analyze the preliminary rendering to identify the set of active printing materials for the print data based at least in part on the pixel threshold filter by:

identifying the set of active printing materials that include at least one of C, M, Y, and K.

6. The system according to claim 1, wherein the active printing material identification engine is to analyze the preliminary rendering to identify the set of active printing materials for the print data based at least in part on the pixel threshold filter by:

determining whether a number of pixels of the preliminary rendering that include a specified printing material from a set of available printing materials is greater than a pixel threshold of the pixel threshold filter; and in response to a determination that the number of pixels of the preliminary rendering that include the specified printing material from the set of available printing materials is greater than the pixel threshold of the pixel threshold filter, adding the specified printing material to the set of active printing materials.

7. The system according to claim 1, wherein the active printing material identification engine is to analyze the preliminary rendering to identify the set of active printing materials for the print data based at least in part on the pixel threshold filter by:

determining whether a percentage of pixels of the preliminary rendering that include a specified printing material from a set of available printing materials is greater than a pixel percentage threshold of the pixel threshold filter; and in response to a determination that the percentage of pixels of the preliminary rendering that include the specified printing material from the set of available printing materials is greater than the pixel percentage threshold of the pixel threshold filter, adding the specified printing material to the set of active printing materials.

8. The system according to claim 1, wherein the active printing material identification engine is to analyze the preliminary rendering to identify the set of active printing materials for the print data based at least in part on the pixel threshold filter by:

determining, for each object of a plurality of objects of the preliminary rendering, whether a number of pixels of an object that include a specified printing material from a set of available printing materials is greater than a pixel object threshold of the pixel threshold filter, wherein the object includes a plurality of adjacently disposed pixels; and in response to a determination, for each object of the plurality of objects of the preliminary rendering, that the number of pixels of the object that include the specified printing material from the set of available printing materials is greater than the pixel object threshold of the pixel threshold filter, adding the specified printing material to the set of active printing materials.

9. A method for classification based printing material set selection comprising:

analyzing a preliminary rendering of print data to classify each object of a plurality of objects of the preliminary rendering by determining a printing material combination for printing each object, wherein an object includes a predetermined number of adjacently disposed pixels;

determining, based on an analysis of each of the classified objects, a superset of printing materials for all of the plurality of objects, wherein the superset of printing materials includes printing materials common to all of the plurality of objects;

selecting, based on the determination of the superset of printing materials for all of the plurality of objects, a set of printing materials from a plurality of available printing materials that is to be activated for a print job specified by the print data;

generating, by a processor, raster data based at least in part on a further rendering of the print data and the set of selected printing materials; and generating further print data including the raster data and the set of selected printing materials.

10. The method according to claim 9, wherein the preliminary rendering includes a different color management compared to a color management used for the further rendering of the print data, further comprising:

selecting the different color management from a set of available color managements, wherein the different color management includes reduced transitions between printing materials of the plurality of available printing materials.

11. The method according to claim 9, wherein analyzing the preliminary rendering of print data to classify each object of the plurality of objects of the preliminary rendering by determining the printing material combination for printing each object further comprises:

determining, for each object of the plurality of objects of the preliminary rendering, whether a number of pixels of an object that include a specified printing material from the plurality of available printing materials is greater than a pixel object threshold; and in response to a determination, for each object of the plurality of objects of the preliminary rendering, that the number of pixels of the object that include the specified printing material from the plurality of available printing materials is greater than the pixel object threshold, adding the specified printing material to the superset of printing materials.

12. The method according to claim 9, wherein analyzing the preliminary rendering of print data to classify each object of the plurality of objects of the preliminary rendering by determining the printing material combination for printing each object further comprises:

determining, for each object of the plurality of objects of the preliminary rendering, whether a percentage of pixels of an object that include a specified printing material from the plurality of available printing materials is greater than a pixel object threshold; and in response to a determination, for each object of the plurality of objects of the preliminary rendering, that the percentage of pixels of the object that include the specified printing material from the plurality of available printing materials is greater than the pixel object threshold, adding the specified printing material to the superset of printing materials.

13. A non-transitory computer readable medium having stored thereon machine readable instructions to provide classification based printing material set selection, the machine readable instructions, when executed, cause a processor to:
generate a preliminary rendering of print data;
analyze the preliminary rendering to identify a set of active printing materials for the print data based at least in part on a pixel threshold filter by
  determining, for each object of a plurality of objects of the preliminary rendering, whether a number of pixels of an object that include a specified printing material from a set of available printing materials is greater than a pixel object threshold of the pixel threshold filter, wherein the object includes a plurality of adjacently disposed pixels, and
  in response to a determination, for each object of the plurality of objects of the preliminary rendering, that the number of pixels of the object that include the specified printing material from the set of available printing materials is greater than the pixel object threshold of the pixel threshold filter, adding the specified printing material to the set of active printing materials;
generate raster data based at least in part on a further rendering of the print data and the set of active printing materials; and
generate further print data including the raster data and the set of active printing materials.

14. The non-transitory computer readable medium of claim 13, wherein the set of active printing materials is identified from the set of available printing materials that include a predetermined number of base printing materials that is greater than one and a predetermined number of additional printing materials that is greater than zero, and wherein the machine readable instructions to analyze the preliminary rendering to identify the set of active printing materials for the print data based at least in part on the pixel threshold filter, when executed, further cause the processor to:
identify the set of active printing materials that include at least one of the predetermined number of base printing materials, and none of the predetermined number of additional printing materials.

15. The non-transitory computer readable medium of claim 13, wherein the machine readable instructions to analyze the preliminary rendering to identify the set of active printing materials for the print data based at least in part on the pixel threshold filter, when executed, further cause the processor to:
determine, for each object of the plurality of objects of the preliminary rendering, whether the number of pixels of the object that include the specified printing material from the set of available printing materials is greater than the pixel object threshold of the pixel threshold filter;
determine, for each object of the plurality of objects of the preliminary rendering, whether the number of pixels of the object that include another specified printing material from the set of available printing materials is greater than another pixel object threshold of the pixel threshold filter; and
in response to a determination, for each object of the plurality of objects of the preliminary rendering,
  that the number of pixels of the object that include the specified printing material from the set of available printing materials is greater than the pixel object threshold of the pixel threshold filter, and
  that the number of pixels of the object that include the other specified printing material from the set of available printing materials is greater than the other pixel object threshold of the pixel threshold filter, add the specified printing material to the set of active printing materials.

* * * * *